US006542546B1

(12) United States Patent
Vetro et al.

(10) Patent No.: US 6,542,546 B1
(45) Date of Patent: Apr. 1, 2003

(54) ADAPTABLE COMPRESSED BITSTREAM TRANSCODER

(75) Inventors: Anthony Vetro, Staten Island, NY (US); Ajay Divakaran, Denville, NJ (US); Huifang Sun, Cranbury, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/496,706

(22) Filed: Feb. 2, 2000

(51) Int. Cl.$^7$ ................................................. H04N 7/26
(52) U.S. Cl. ............................ 375/240.12; 375/240.26; 707/514
(58) Field of Search ........................ 375/240.12, 240.26; 707/514; H04N 7/26

(56) References Cited

U.S. PATENT DOCUMENTS 6,345,279 B1 * 2/2002 Li et al. ..................... 707/514

OTHER PUBLICATIONS

"Coding of Moving Pictures and Audio"; International Organization for Standardization; ISO/IEC JTC1/SC29/WG11/N2861, Jul., 1999/Vancouver.

* cited by examiner

*Primary Examiner*—Howard Britton
(74) *Attorney, Agent, or Firm*—Dirk Brinkman; Andrew J. Curtin

(57) ABSTRACT

A multi-media delivery system for delivering a compressed bitstream through a network to a user device includes a transcoder and a manager. The transcoder is configured to operate on the bit stream using in any one of a plurality of conversion modes. The manager is configured to selecting a particular one of the plurality of conversion modes dependent on semantic content of the bitstream and network characteristics. The system also includes a content classifier to determine the content characteristics, and a model predicator to determine the network characteristics, and user device characteristics. An integrator of the manager generates an optimal rate-quality function to be used for selecting the particular conversion model for a given available bit rate of the network.

18 Claims, 4 Drawing Sheets

ADAPTABLE COMPRESSED BITSTREAM TRANSCODER

FIELD OF THE INVENTION

This invention relates generally to information delivery systems, and more particularly to delivery systems that adapt information encoded as compressed bitstreams to available bit rates of a network and to semantic content of the bitstream.

BACKGROUND OF THE INVENTION

Recently, a number of standards have been developed for communicating encoded information. For digital images, the best known standard is JPEG, see Pennebacker et al., in "JPEG Still Image Compression Standard," Van Nostrand Reinhold, 1993. For video sequences, the most widely used standards include MPEG-1 (for storage and retrieval of moving pictures), MPEG-2 (for digital television) and H.263, see ISO/IEC JTC1 CD 11172, MPEG, "Information Technology—Coding of Moving Pictures and Associated Audio for Digital Storage Media up to about 1.5 Mbit/s—Part 2: Coding of Moving Pictures Information," 1991, LeGall, "MPEG: A Video Compression Standard for Multimedia Applications," Communications of the ACM, Vol. 34, No. 4, pp. 46–58, 1991, ISO/IEC DIS 13818-2, MPEG-2, "Information Technology—Generic Coding of Moving Pictures and Associated Audio Information—Part 2: Video," 1994, ITU-T SG XV, DRAFT H.263, "Video Coding for Low Bitrate Communication," 1996, ITU-T SG XVI, DRAFT13 H.263+Q15-A-60 rev.0, "Video Coding for Low Bitrate Communication," 1997.

These standards are relatively low-level specifications that primarily deal with the spatial compression of images and the spatial and temporal compression of video sequences. As a common feature, these standards perform compression on a per frame basis. With these standards, one can achieve high compression ratios for a wide range of applications.

Newer video coding standards, such as MPEG-4 (for multimedia applications), see "Information Technology—Generic coding of audio/visual objects," ISO/IEC FDIS 14496-2 (MPEG4 Visual), Nov. 1998, allow arbitrary-shaped objects to be encoded and decoded as separate video object planes (VOP). The objects can be visual, audio, natural, synthetic, primitive, compound, or combinations thereof.

The emerging MPEG-4 standard is intended to enable multimedia applications, such as interactive video, where natural and synthetic materials are integrated, and where access is universal. For example, one might want to "cut-and-paste" a moving figure or object from one video to another. In this type of application, it is assumed that the objects in the multimedia content have been identified through some type of segmentation process, see for example, U.S. patent application Ser. No. 09/326,750 "Method for Ordering Image Spaces to Search for Object Surfaces" filed on Jun. 4, 1999 by Lin et al.

In the context of video transmission, these compression standards are needed to reduce the amount of bandwidth (available bit rate) that is required by the network. The network may represent a wireless channel or the Internet. In any case, the network has limited capacity and a contention for its resources must be resolved when the content needs to be transmitted.

Over the years, a great deal of effort has been placed on architectures and processes that enable devices to transmit the content robustly and to adapt the quality of the content to the available network resources. When the content has already been encoded, it is sometimes necessary to further compress the already compressed bitstream before the stream is transmitted through the network to accommodate a reduction in the available bit rate.

As shown in FIG. 1, typically, this can be accomplished by a transcoder 100. In a brute force case, the transcoder includes a decoder 110 and encoder 120. A compressed input bitstream 101 is fully decoded at an input rate Rin, then encoded at a new output rate Rout 102 to produce the output bitstream 103. Usually, the output rate is lower than the input rate. However, in practice, full decoding and full encoding in a transcoder is not done due to the high complexity of encoding the decoded bitstream.

Earlier work on MPEG-2 transcoding has been published by Sun et al., in "Architectures for MPEG compressed bitstream scaling," IEEE Transactions on Circuits and Systems for Video Technology, April 1996. There, four methods of rate reduction, with varying complexity and architecture, were presented.

FIG. 2 shows an example method. In this architecture, the video bitstream is only partially decoded. More specifically, macroblocks of the input bitstream 201 are variable-length decoded (VLD) 210. The input bitstream is also delayed 220 and inverse quantized (IQ) 230 to yield discrete cosine transform (DCT) coefficients. Given the desired output bit rate, the partially decoded data are analyzed 240 and a new set of quantizers is applied at 250 to the DCT blocks. These re-quantized blocks are then variable-length coded (VLC) 260 and a new output bitstream 203 at a lower rate can be formed. This scheme is much simpler than the scheme shown in FIG. 1 because the motion vectors are re-used and an inverse DCT operation is not needed.

More recent work by Assuncao et al., in "A frequency domain video transcoder for dynamic bit-rate reduction of MPEG-2 bitstreams," IEEE Transactions on Circuits and Systems for Video Technology, pp. 953–957, December 1998, describe a simplified architecture for the same task. They use a motion compensation (MC) loop, operating in the frequency domain for drift compensation. Approximate matrices are derived for fast computation of the MC blocks in the frequency domain. A Lagrangian optimization is used to calculate the best quantiser scales for transcoding.

Other work by Sorial et al, "Joint transcoding of multiple MPEG video bitstreams," Proceedings of the International Symposium on Circuits and Systems, May 1999, presents a method of jointly transcoding multiple MPEG-2 bitstreams, see also U.S. patent application Ser. No. 09/410,552 "Estimating Rate-Distortion Characteristics of Binary Shape Data," filed Oct. 1, 1999 by Vetro et al.

According to prior art compression standards, the number of bits allocated for encoding texture information is controlled by a quantization parameter (QP). The above papers are similar in that changing the QP based on information that is contained in the original bitstream reduces the rate of texture bits. For an efficient implementation, the information is usually extracted directly in the compressed domain and may include measures that relate to the motion of macroblocks or residual energy of DCT blocks. This type of analysis can be found in the bit allocation analyzer.

Although in some cases, the bitstream can be preprocessed, it is still important that the transcoder operates in real-time. Therefore, significant processing delays on the bitstream cannot be tolerated. For example, it would not be feasible for the transcoder to extract information from a group of frames, then transcode the content based on this look-ahead information. This would not work for live broadcasts, or video conferencing. Although it is possible to achieve better transcoding results in terms of quality due to better bit allocation, such an implementation for real-time applications is impractical.

It is also important to note that classical methods of transcoding are limited in their ability to reduce the bit rate. In other words, if only the QP of the outgoing video is changed, then there is a limit to how much one may reduce the rate. The limitation in reduction is dependent on the bitstream under consideration. Changing the QP to a maximum value will usually degrade the content of the bitstream significantly. Another alternative to reducing the spatial quality is to reduce the temporal quality, i.e., drop or skip frames. Again, skipping too many frames will also degrade the quality significantly. If both reductions are considered, then the transcoder is faced with a trade-off in spatial versus temporal quality. However, even with such reduction in spatial and temporal resolution, it may be difficult for the transcoder to meet its target rate without destroying the content that is conveyed by the original video bitstream.

As a result, the transcoder must find some alternate means of transmitting the information that is contained in a bitstream to adapt to reductions in available bit rates.

SUMMARY OF THE INVENTION

The invention provides a multi-media delivery system for delivering a compressed bitstream through a network to a user device. The system includes a transcoder and a manager. The transcoder is configured to operate on the bit stream using any one of a plurality of conversion modes. The manager is configured to select a particular one of the plurality of conversion modes depending on semantic content of the bitstream and network characteristics. The system also includes a content classifier to determine the content characteristics, and a model predicator to determine the network characteristics, and user device characteristics. An integrator of the manager generates optimal rate-quality functions to be used for selecting the particular conversion model for a given available bit rate of the network.

DETAILED DESCRIPTION OF PREFERRED EMBODIMENTS

Introduction

Quality of Bitstream

Figure 1:
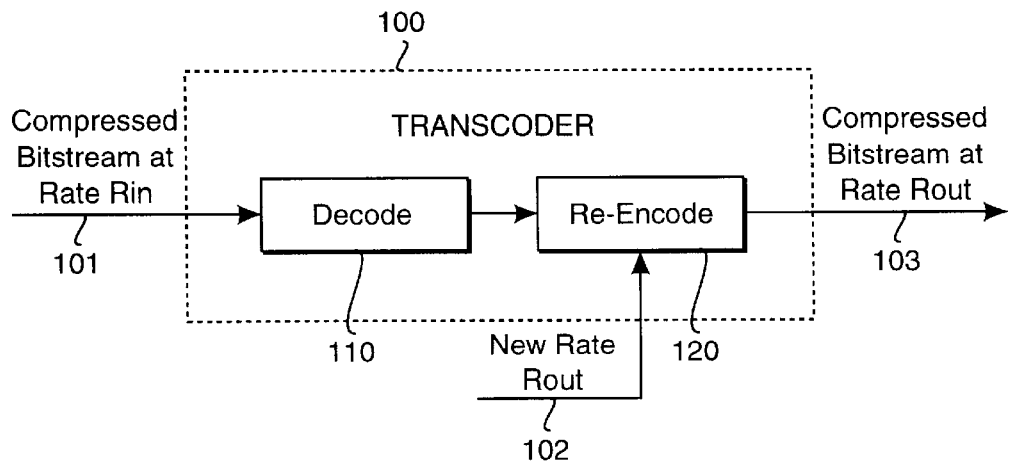
FIG. 1 is a block diagram of a prior art transcoder.
Figure 2:
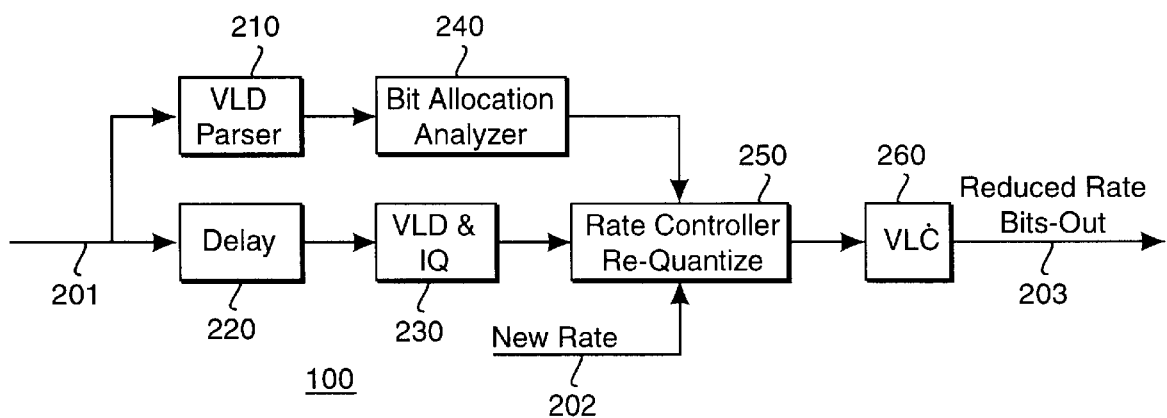
FIG. 2 is a block diagram of a prior art partial decoder/encoder.

We describe a bitstream delivery system that is capable of converting a compressed input bitstream to a compressed output bitstream at a target rate, i.e., an available bit rate (ABR) of a network. Usually the target rate is less than the original rate. In other words, the task of the transcoder is to further compress the bitstream, usually due to constraints in network resources.

The novelty of our system is that it is capable of overcoming the drawbacks of conventional transcoders, namely limitations in rate conversion, particularly in real-time applications. Although conventional transcoding techniques may be able to sufficiently reduce the rate, the quality of the content may be severely degraded and the information that is conveyed in the reduced bit rate bitstream may be lost altogether. Conventionally, bitstream "quality" is measured as the bit-by-bit differences between the input and output bitstreams.

We describe an alternative transcoding technique that is able to achieve the target rate while maintaining the quality of the bitstream.

Continuous Conversion

Conventional transcoding techniques can be defined as continuous-conversions. Because conventional techniques attempt to continuously maintain the best trade-off in spatial vs. temporal quality, the output is always a sequence of frames that best represents the input sequence. When a particular frame is skipped to meet constraints on the rate, the information that is contained within the skipped frame is not considered. If enough frames are skipped, then the bitstream that is received is meaningless to a user, or at the very best, less than satisfactory.

Quality Distortion Metrics

A conventional continuous-conversion transcoder makes optimal decisions in the rate-distortion sense with regard to the trade-offs in spatial and temporal quality. In such a transcoder, the distortion is usually taken to be any classic distortion metric, such as the peak signal to noise ratio (PSNR). It should be emphasized that in such a conversion, the distortion is not a measure of how well the content of the bitstream is being conveyed, but rather of the bit-to-bit differences between the original input bitstream and the reconstructed output bitstream, i.e., the quality.

Fidelity of Bitstream

In one example for transcoding a bitstream sequence under low bit rate constraints according to the present invention, we summarize the content of the bitstream with a small number of frames. In this way, we do not use the classic distortion metrics focused on quality. Rather, we adopt a new measure we call "fidelity." Fidelity takes into consideration the semantics of the content. By the semantics, we do not mean the bits or pixels, but rather humanly meaningful concepts represented by the bit, for example, words, sounds, image objects, scenes, and the like.

Fidelity can be defined in a number of ways. However fidelity, as we define it, is not related to conventional quantitative quality, e.g., the bit-by-bit differences. Rather, our fidelity measures the degree to which a frame or any number of frames conveys the information contained in the original image sequence, i.e., the content or higher level meaning of the information that is conveyed, and not the raw bits.

Discrete-Summary Transcoder

Fidelity is a more subjective or semantic measure than conventional distortion metrics. However, fidelity is a useful measure to gauge the non-conventional transcoder's performance. Because the output of our transcoder is a finite set of relatively high quality frames that attempt to summarize the entire sequence of bits, we refer to this type of transcoder as a "discrete-summary transcoder."

For example, at low bit rates, we choose a small number of high quality frames to represent the video. In this way the semantic "meaning" of the bitstream is preserved.

It could be stated that our discrete-summary transcoder performs a semantic sampling of the input bitstream, whereas continuous transcoders only sample quantitatively in the spatial and temporal domains. In situations where the bit rate is severely limited, we sample "rich" frames to preserve the fidelity of the content encoded in the bitstream.

Because we selectively sample rich frames, we may lose one aspect in the bitstream—motion. Preferably, we resort to discrete-summary transcoding only when the rate-distortion performance of the continuous-conversion transcoder is severely degraded or cannot meet the target rate. Under these conditions, conventional continuous-conversion transcoders lose fluid motion because the frame rate is so low that the rate of information delivery becomes jerky and disturbing to the user.

The major gain of discrete-summary transcoding according to the invention over conventional continuous-conversion transcoding is that discrete-summary transcoders attempts to choose frames that are rich in information, whereas continuous-conversion transcoders may well drop frames that are rich in information.

In order to control which transcoder is best for the given situation, we describe a content-network-device (CND) manager. The purpose of the CND manager is to select which transcoder to use. The selection is based on data obtained from content, network, user device characteristics.

Adaptable Bitstream Delivery System

Figure 3:
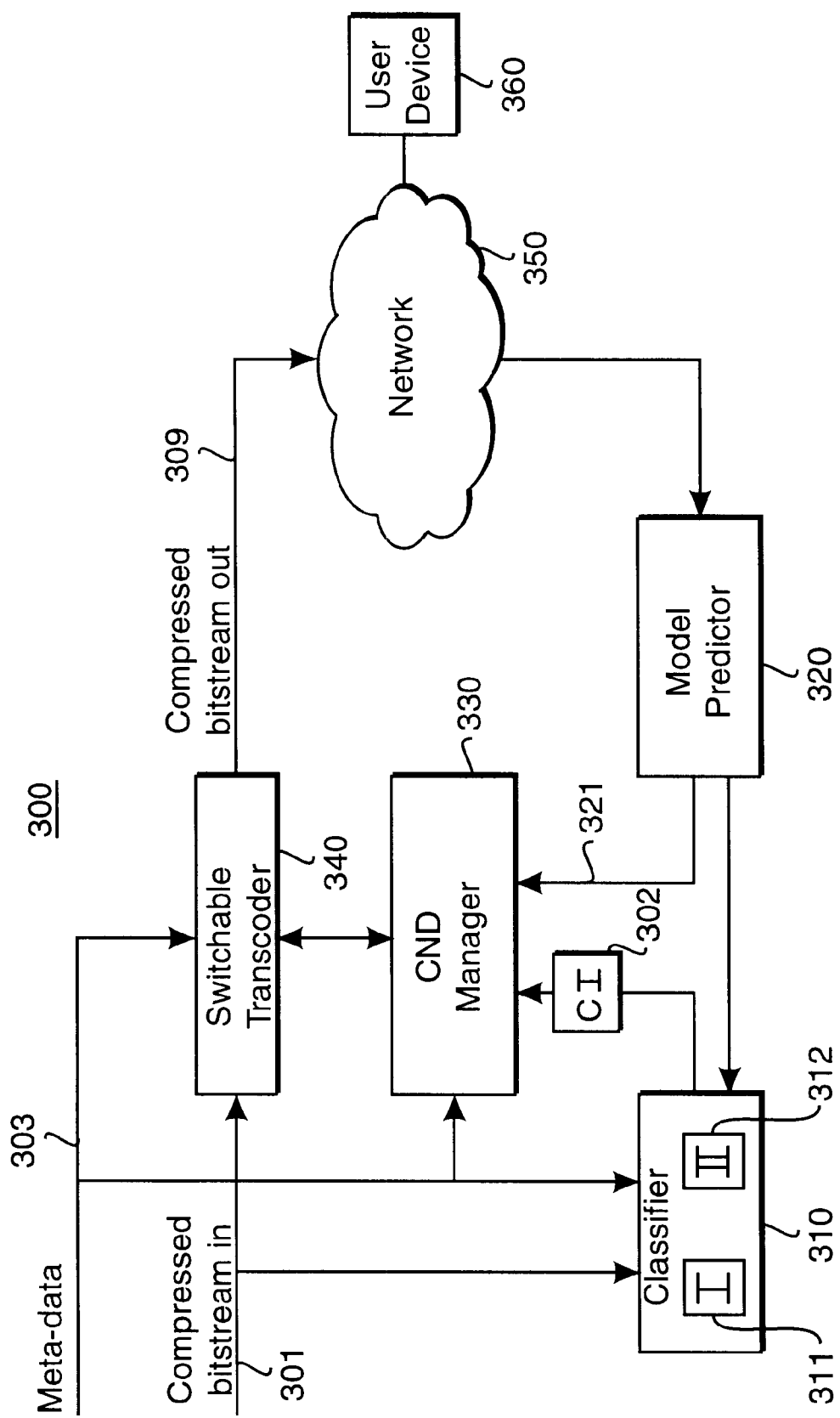
FIG. 3 is a block diagram of an adaptable bitstream delivery system according to the invention.

As shown in FIG. 3, our adaptable bitstream delivery system 300 is composed of four major components: a content classifier 310, a model predictor 320, a content-network-device manager 330 and a switchable transcoder 340.

The goal of our system 300 is to deliver a compressed bitstream 301 with information content through a network 350 to a user device 360. The content of the bitstream can be visual, audio, textual, natural, synthetic, primitive, data, compound or combinations thereof. The network can be wireless, packet-switched, or other networks with unpredictable operational characteristic. The user device can be a video receiver, a wireless receiver stationary or mobile, or other like user devices with internal resource constraints that make quality reception of the bitstream difficult.

As an advantage, our system maintains the semantic fidelity of the content even when the bitstream needs to be further compressed to meet network and user device characteristics.

The input compressed bitstream is directed to the transcoder and the content classifier. The transcoder may ultimately reduce the rate of an output compressed bitstream 309 directed through the network at the user device.

The content classifier extracts content information (CI) 302 from the input bitstream for the manager. The main function of the content classifier is to map semantic features of content characteristics, such as activity, scene change information and texture, into a set of parameters that are used to make rate-quality trade-offs in the content-network manager. To assist with this mapping function, the content classifier can also accept meta-data information 303. Examples of meta-data include descriptors and description schemes that are specified by the emerging MPEG-7 standard.

In our architecture, the model predictor 320 provides feedback 321 regarding the dynamics of the network 340, and possible constraining characteristics of the user device 360. For example, the predictor reports network congestion and available bit rate (ABR). The predictor also receives and translates feedback on packet loss ratios within the network. The predictor estimates a current network state, and long-term network predictions 321. Characteristically, the user device may have limited resources. For example, processing power, memory, and display constraints. For example, if the user device is a cellular telephone, the display can be constrained to textual information or low resolution images, or even worse, only audio. This characteristics can also impact the selection of a transcoding modality.

In addition to receiving the meta-data 303, the manager 330 also receives input from both the content classifier and the model predictor. The CND combines these two sources of information together so that an optimal transcoding strategy is determined for the switchable transcoder 340.

Content Classifier

In the field of pattern analysis and recognition, classification can be achieved by decomposing the bitstream into a set of features. The features themselves may be extracted using sophisticated transforms or simple local operators. Regardless of how the features are extracted, given a feature space of dimension N, each pattern can be represented as a point in this feature space.

It is customary to subject a variety of different training patterns as input to this extraction process and to plot the outcomes in the feature space. Provided that the feature set and training patterns are appropriate, we observe several clusters of points called "classes." These classes allow us to distinguish different patterns and group similar patterns, and to determine boundaries between the observed classes. Usually, the boundaries between classes adhere to some cost for misclassification and attempt to minimize the overall error.

After appropriate classes have been identified and suitable boundaries between the classes have been drawn, we can quickly classify new patterns in the bitstream. Depending on the problem, this can be accomplished with a neural network or other known classification techniques such as Support Vector Machines, see Cristianini et al. in "An Introduction to Support Vector Machines, (and other kernel-based learning methods)," Cambridge University Press, 2000.

Our content classifier operates in two stage (I and II). First, we classify the bitstream content so that higher-level semantics can be inferred, and second, we adapt the classified content to network and user device characteristics. In the first stage (I) 311, we extract a number of low-level features from the compressed bitstream using conventional techniques, for example, motion and texture. We can also access the meta-data 303, such as MPEG-7 descriptors and description schemes. If the meta-data are available, then less work needs to be performed on the compressed bitstream. As a final outcome of this first stage, a pre-determined set of content features are mapped to a finite set of semantic classes. Furthermore, within each semantic class, we differentiate based on the coding complexity, i.e., the complexity is conditional on the semantic class and network characteristics, and possibly device characteristics.

This high-level understanding of the content is passed onto the CND manager 330 as content information (CI) 302. The CI 302, in part, characterizes the potential performance of the switchable transcoder according to our invention.

The above classification is useful in terms of content understanding, and, ultimately discrete-summary transcoding, but it is also useful as an intermediate stage result. Essentially, we have a new set of classes that serve as input to the second stage II 312 of classification. In the second stage of classification, we map our semantic classes to features of network and device characteristics. These features will help us to determine the characteristics of rate-quality functions that assist the system in developing a transcoding strategy. In other words, if it is probable that a certain semantic class is characterized by bursty data due to object movement or scene changes, then this should be accounted for when estimating how much resource the network should provide.

Content-Network-Device Manager

Figure 4:
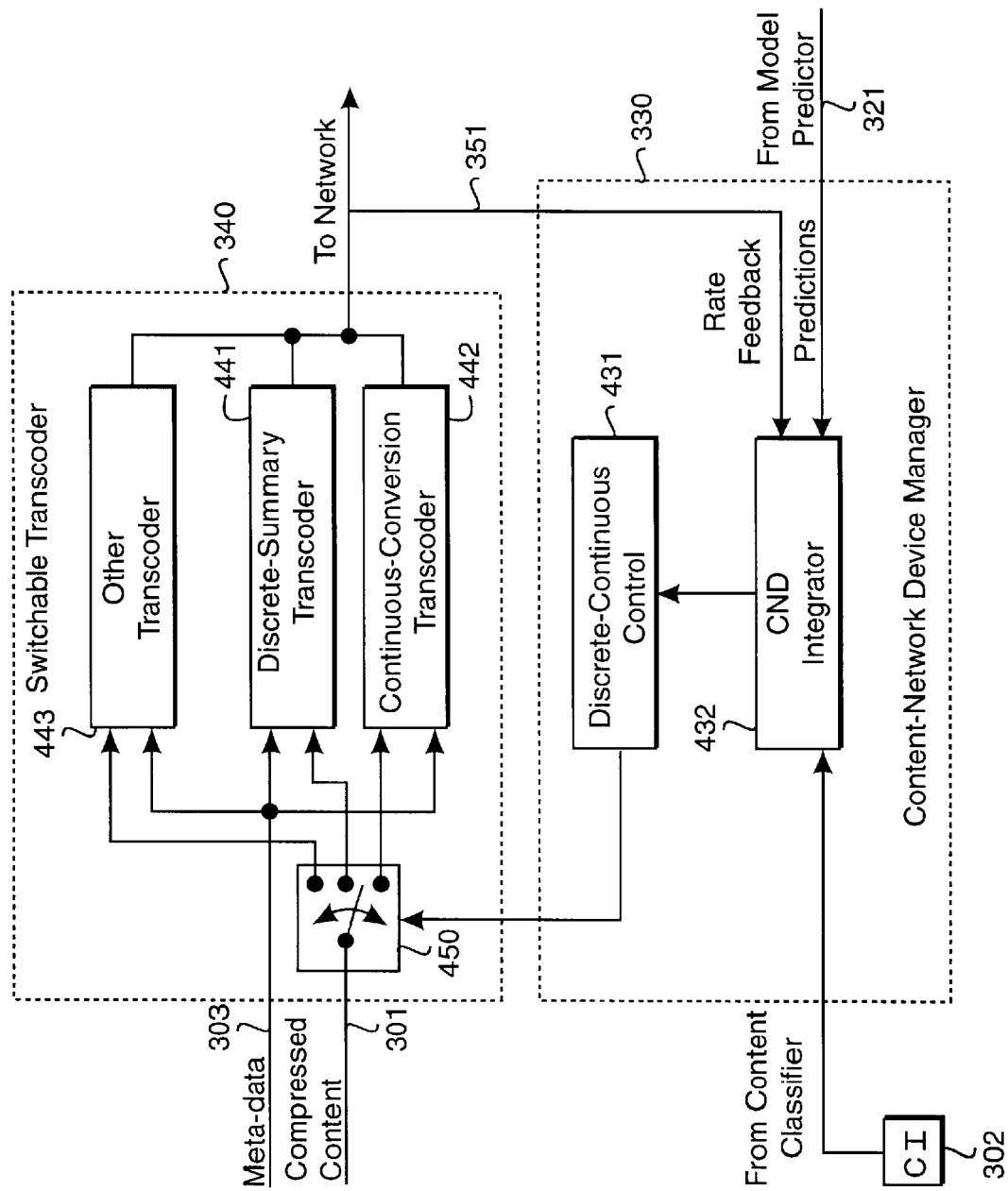
FIG. 4 is a block diagram of an adaptable transcoder and transcoder manager according to the invention.

The content-network-device (CND) manager 330 and transcoder 340 are shown in greater detail in FIG. 4. The CND manager includes a discrete-continuous control 431 and a content-network-device (CND) integrator 432. The transcoder 340 includes a plurality of transcoder 441–443.

The control 431 is responsible for deciding, using a switch 450, how the input compressed bitstream 301 should be transcoded, e.g., with the discrete summary transcoder 441, the continuous conversion transcoder, 442, or some other transcoder 443. The network-content manager also dynamically adapts a target rate for the transcoder and considers resource constraining characteristics of the network and user device. These two very important items are decided by the control 431.

Figure 5:
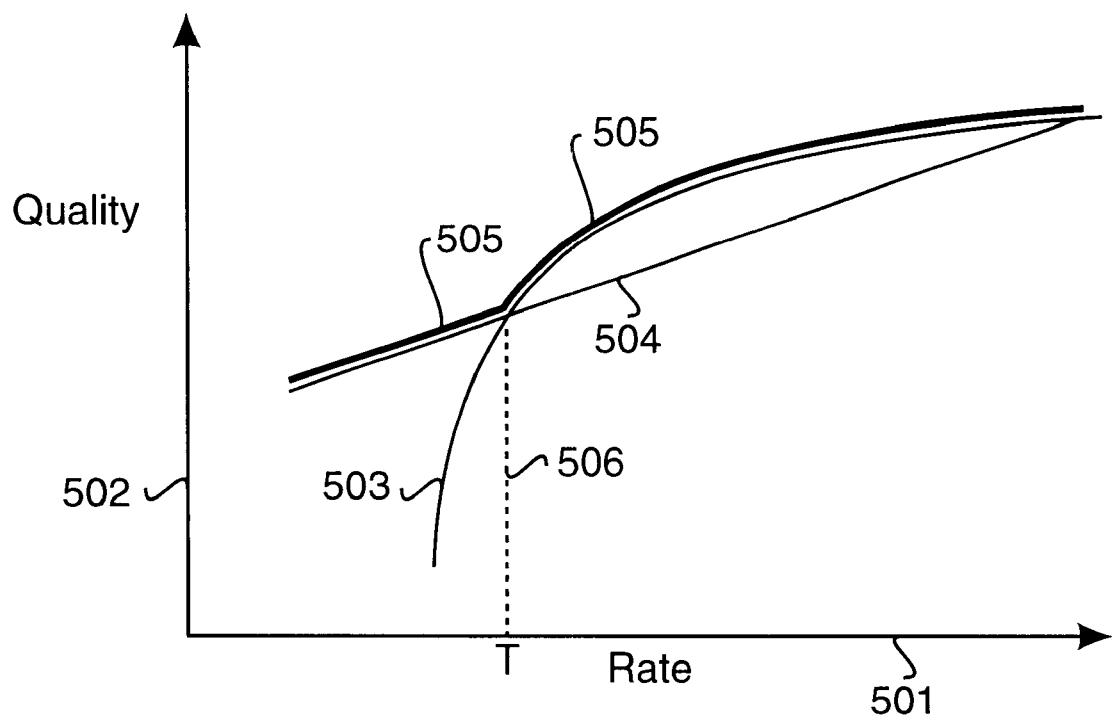
FIG. 5 is a graph of transcoding functions that can be used by the transcoder and manager of FIG. 4.

To better understand how the control makes optimal selection decisions, FIG. 5 graphs a plurality of rate-quality functions on rate 501 and quality 502 scales. One rate-quality function of the continuous-conversion transcoder 442 is shown by a convex function 503. The rate-quality curve for the discrete-summary transcoder 441 is represented by a linear function 504. Other transcoders may have different functions not shown.

It should be noted that these curves are only drawn for illustrative purposes. The true forms of the functions for a particular transcoder can vary depending on the content, how the content has been classified and possibly the current state of the network and device constraining characteristics. Obviously, at low bit rates the continuous-conversion transcoder degrades rapidly in quality, for reasons stated above. The optimal quality function 505 is shown in bold. This function best models the optimal quality that can be achieved for a given bit rate and user device.

We note there is a crossover in transcoding technique at a rate=T 506. For rates greater than T, it is best to use the continuous-conversion transcoder, and for rates less than T, it is best to use the discrete-summary transcoder. Of course the cross-over point will vary dynamically as content and network characteristics vary.

As mentioned above, continuous-conversion transcoders usually assume classic distortion metrics, such as PSNR. Because such measures do not apply to our discrete-summary transcoder, it makes more sense to map the classic distortion metrics to a measure of "fidelity." Fidelity measures how well the content is semantically summarized, and not the quantitative bit-by-bit difference. Given the same quality metric, we avoid any inconsistency in deciding the optimal transcoding strategy.

Content-Network-Device Integrator

Referring back to FIG. 4, the CND integrator 432 is the part of the CND manager that combines together content information 302 from the content classifier 310 and network-device predictions 321 from the model predictor. It is this part of the manager that generates the model expressed as the rate-quality functions shown in FIG. 5, or other like optimization functions. To form the optimal operating model 321, the CND integrator, examines the mappings CI from the content classifier and bit rate feedback 351 that is output from the switchable transcoder 340. Using this information, the integrator chooses the optimal modeling function 505 that has certain model parameters. The rate feedback 351 is used to dynamically refine the parameters. If the integrator finds that the chosen model is not optimal, then the integrator may decide to dynamically switch rate-quality functions. Also, the integrator may track several functions for different objects or different bitstreams and consider the functions either separately or jointly.

Impact of Network Predictions

The network predictions 321 may affect these characteristic functions by modulating certain portions of the optimal curve 505 one way or another. For instance, when higher bit rates are available, one still needs to be most careful. The network model may allows us to expend a high number of bits at a particular time instant, but long-term effects tell us that congestion is likely to build quickly, therefore, our system may choose to hold back and continue to operate at a lower rate. Thus, we avoid problems related to a sudden drop in the available bit rate. These types of characteristics can be accounted for by modulating the curves of our transcoder.

Impact of Device Constraints

Device characteristics need to be consider also. Mobile devices have different operating characteristics than stationary devices, for example Doppler spread can degrade performance at higher available bit rates. Thus, a lower bit rate should be selected. The device may have limited processing, storage and display capabilities that can impact the transcoder. For example, there is no point in delivering a video to an audio only device. In fact, the switchable transcoder can include another transcoder 443 that converts speech to text, or data to speech, etc. The important point is that the present switchable transcoder takes the semantics of the bitstream content and the destination device into consideration, most prior art transcoders just consider the available bit rate.

Transcoder

We do not elaborate on the operation of the transcoders, since techniques for implementing various types of transcoders can easily be found in the prior art. For example, so any of the following U.S. Pat. No. 5,991,716—Transcoder with prevention of tandem coding of speech; U.S. Pat. No. 5,940,130—Video transcoder with by-pass transfer of extracted motion compensation data; U.S. Pat. No. 5,768,278—N: 1 Transcoder; U.S. Pat. No. 5,764,298 Digital data transcoder with relaxed internal decoder/coder interface frame jitter requirements; U.S. Pat. No. 5,526, 397—Switching transcoder; U.S. Pat. No. 5,334,977—ADPCM transcoder wherein different bit numbers are used in code conversion, or other like patents.

The emphasis of this invention is to enable dynamic selection of a transcoding strategy that gives the best delivery of the semantic content of the bitstream, and not how the actual transcoding is performed.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. An apparatus for delivering a compressed bitstream through a network to a user device, comprising:
    a transcoder configured to operate on the bit stream using any one of a plurality of conversion modes;
    a manager configured to selecting a particular one of the plurality of conversion modes dependent on semantic content of the bitstream and network characteristics.

2. The apparatus of claim 1 wherein the manager selects the particular one of the plurality of conversion modes dependent on user device characteristics.

3. The apparatus of claim 2 further comprising;

a classifier coupled to receive the bitstream; and a model predictor coupled to receive the network and device characteristics.

4. The apparatus of claim 1 wherein the content of the bitstream is selected to be any of visual, audio, textual, natural, synthetic, primitive, and compound, and combinations.

5. The apparatus of claim 3 wherein the classifier extract content information from the bitstream to map semantic features of the content characteristics.

6. The apparatus of claim 5 wherein the classifier receives meta-data of the bitstream to map semantic features of the content characteristics.

7. The apparatus of claim 1 wherein the network characteristics include network congestion, available bit rate, and packet loss ratios.

8. The apparatus of claim 2 wherein device characteristics include processing power, memory, and display constraints.

9. The apparatus of claim 3 wherein the classifier classifies semantic content of the bitstream.

10. The apparatus of claim 3 wherein the classified content is classified according to the network characteristics, the characteristics, and rate feedback from the transcoder.

11. The apparatus of claim 1 wherein the manager includes a control and an integrator.

12. The apparatus of claim 11 wherein the transcoder includes a plurality of transcoders, each transcoder operating in one of the plurality of conversion modes.

13. The apparatus of claim 12 wherein the plurality of different transcoders include a discrete-summary transcoder, and a continuous conversion transcoder.

14. The apparatus of claim 12 wherein the manager generates a plurality of rate-quality functions from the content and network characteristics.

15. The apparatus of claim 14 wherein the control selects a particular one of the plurality of conversion modes dependent on maximizing the plurality of rate-quality functions for a particular bit rate of the network.

16. The apparatus of claim 15 wherein the selection is dynamic.

17. A method for delivering a compressed bitstream through a network to a user device, comprising the steps of:

classifying semantic content of the bitstream;

predicting an operation of the network;

selecting one of a plurality of conversion modes of a transcoder dependent on the semantic content and the predicted operation of the network.

18. The method of claim 1 further comprising:

selecting one of the plurality of conversion modes of the transcoder dependent on user device characteristics.

* * * * *